United States Patent
Tiprika et al.

(10) Patent No.: US 11,823,198 B1
(45) Date of Patent: Nov. 21, 2023

(54) CONTEXTUALLY ESCALATED AUTHENTICATION BY SYSTEM DIRECTED CUSTOMIZATION OF USER SUPPLIED IMAGE

(71) Applicant: Wells Fargo Bank, N.A., San Francisco, CA (US)

(72) Inventors: Om Sri Chaturvedi Tiprika, Hyderabad (IN); Srinivasa Reddy Elakoti, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 479 days.

(21) Appl. No.: 16/278,546

(22) Filed: Feb. 18, 2019

(51) Int. Cl.
*G06Q 20/40* (2012.01)
*G06F 21/31* (2013.01)
*G06F 21/36* (2013.01)

(52) U.S. Cl.
CPC ....... *G06Q 20/4016* (2013.01); *G06F 21/316* (2013.01); *G06F 21/36* (2013.01); *G06Q 20/40145* (2013.01); *G06F 2221/2133* (2013.01)

(58) Field of Classification Search
CPC ........ G06F 21/316; G06F 21/32; G06F 21/36; G06F 2221/2133; G06Q 20/40–20/4016; G06Q 20/40145
USPC ......................................................... 705/75
See application file for complete search history.

(56) References Cited

U.S. PATENT DOCUMENTS

| | | | |
|---|---|---|---|
| 9,313,200 B2 * | 4/2016 | Hoyos | H04L 63/105 |
| 9,342,677 B2 | 5/2016 | Ali et al. | |
| 9,754,097 B2 | 9/2017 | Hessler | |
| 9,781,105 B2 | 10/2017 | Weiner et al. | |
| 9,805,213 B1 | 10/2017 | Kragh | |
| 9,875,347 B2 * | 1/2018 | Baghdasaryan | G06F 21/32 |
| 9,881,303 B2 | 1/2018 | Vohra et al. | |
| 9,904,775 B2 | 2/2018 | Salama et al. | |
| 10,853,807 B2 * | 12/2020 | Huang | G07F 19/207 |

(Continued)

OTHER PUBLICATIONS

Stewart, "The three types of multi-factor authentication", Global Knowledge, Jun. 26, 2018, 5 pages (Year: 2018).*

(Continued)

*Primary Examiner* — James D Nigh
(74) *Attorney, Agent, or Firm* — K&L Gates LLP

(57) ABSTRACT

A secure authentication system, computer program recording medium and method enable secure transaction with authentication to eradicate fraud. A customer is authenticated via a customer application executed on a communication device. A customer-paced communication session is enabled between the customer application and a transaction system via a network connection. A customer continuity factor is monitored in maintaining the communication session. In response to receiving a customer request via the customer application, a level of trust in current authentication of the customer is determined based on the user continuity factor. In response to the level of trust being below a trust threshold, the customer is directed via the customer application to provide a customer request comprising a customer-supplied image having a specified contextual element. The communication session is re-authenticated to process the user input by the transaction system based on verification of the received user-supplied image.

20 Claims, 9 Drawing Sheets

(56) References Cited

U.S. PATENT DOCUMENTS

| | | | | |
|---|---|---|---|---|
| 2005/0008148 | A1* | 1/2005 | Jacobson | G06F 3/038 380/26 |
| 2009/0140838 | A1* | 6/2009 | Newman | G06Q 20/40145 340/5.83 |
| 2011/0035788 | A1* | 2/2011 | White | H04L 9/3231 726/4 |
| 2012/0204257 | A1* | 8/2012 | O'Connell | G06Q 20/4016 726/19 |
| 2013/0047232 | A1* | 2/2013 | Tuchman | G06Q 30/016 726/7 |
| 2013/0232073 | A1* | 9/2013 | Sheets | H04L 9/3231 705/44 |
| 2013/0340052 | A1* | 12/2013 | Jakobsson | H04L 63/08 726/5 |
| 2015/0012426 | A1* | 1/2015 | Purves | G02B 27/017 705/41 |
| 2015/0120551 | A1 | 4/2015 | Jung et al. | |
| 2015/0188911 | A1* | 7/2015 | Hoyos | H04L 63/0861 713/156 |
| 2015/0332271 | A1 | 11/2015 | Collins et al. | |
| 2016/0055487 | A1* | 2/2016 | Votaw | G06Q 20/384 705/44 |
| 2016/0063503 | A1* | 3/2016 | Kobres | H04L 63/102 705/18 |
| 2016/0189157 | A1* | 6/2016 | Bavirisetty | G06Q 20/4012 705/44 |
| 2016/0224962 | A1* | 8/2016 | Herwig | G06Q 20/206 |
| 2016/0283944 | A1 | 9/2016 | Hubbard | |
| 2017/0032114 | A1 | 2/2017 | Turgeman | |
| 2017/0140144 | A1* | 5/2017 | Bock | G06Q 20/40 |
| 2017/0178431 | A1* | 6/2017 | Ashenfelter | G07C 9/257 |
| 2017/0228525 | A1 | 8/2017 | Wajs | |
| 2017/0345001 | A1 | 11/2017 | Castinado et al. | |
| 2018/0007062 | A1 | 1/2018 | Maheshwari et al. | |
| 2018/0012227 | A1 | 1/2018 | Tunnell et al. | |
| 2018/0027411 | A1 | 1/2018 | Taneja | |
| 2018/0032709 | A1 | 2/2018 | Martin et al. | |
| 2018/0096356 | A1* | 4/2018 | Parekh | G06Q 20/3278 |
| 2018/0114221 | A1 | 4/2018 | Karantzis | |
| 2018/0115551 | A1 | 4/2018 | Cole | |
| 2018/0124047 | A1 | 5/2018 | Fisher et al. | |
| 2018/0225670 | A1 | 8/2018 | Oh et al. | |
| 2018/0276672 | A1 | 9/2018 | Breed et al. | |
| 2018/0332036 | A1* | 11/2018 | Mokhasi | H04L 63/102 |
| 2019/0068594 | A1* | 2/2019 | Sarwar | H04L 63/0876 |
| 2019/0220866 | A1* | 7/2019 | Starr | G06V 40/172 |
| 2019/0222424 | A1* | 7/2019 | Lindemann | H04L 9/3231 |
| 2019/0266576 | A1* | 8/2019 | McCauley | G06F 21/32 |
| 2019/0364426 | A1* | 11/2019 | Muthukrishnan | G06Q 20/3674 |

OTHER PUBLICATIONS

Dias, "The 5 factors of authentication", retrieved from https://dojowithrenan.medium.com/the-5-factors-of-authentication-bcb79d354c13, Dec. 8, 2017, 17 pages (Year: 2017).*

* cited by examiner

```
          ┌─────────┐
          │    1    │
          │ FIG. 3A │
          └────┬────┘
               ▼
```

Direct the customer to provide the customer-supplied image containing the unique image content for additional authentication information to proceed further
*318*

Direct the customer to provide the customer-supplied image containing the unique image content for additional authentication information to proceed further
*318*

◇ Received customer-supplied image verified? 320 — Y / N

Generate alerts to notify the bank server and the customer via his/her registered mobile number about the fraudulent transaction
*322*

Reject the transaction upon generation of alerts
*324*

( END )

Receive physiological data from the communication device
*326*

◇ Mentally Qualified to transact? 328 — N / Y

Send alert to customer service representative to interact with the customer
*330*

Notify the bank server that the customer is authenticated in order to enable the transaction
*332*

( END )

*FIG. 3B*

CONTEXTUALLY ESCALATED AUTHENTICATION BY SYSTEM DIRECTED CUSTOMIZATION OF USER SUPPLIED IMAGE

BACKGROUND

The present application relates to systems and methods for authenticating transactions conducted via a user device, and more particular to systems and methods for authenticating via user supplied self-taken images.

Instances of fraud and account takeover are increasing across the financial industry. Avoidance of fraudulent activities in banking is a great challenge, especially while purchasing financial product from a bank via or conducting financial transactions using a mobile application ("app"). During the purchase for example, if the connection is lost, the mobile application polls the server to get connected again. When the connection is reestablished, there is no means to track whether the mobile application requesting the purchase of the financial product is a valid mobile app or not. There is always a need exist for a method and system that enhances safety of high-volume transaction using a serverless architecture, and to provide more confidence to the customers.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

In one aspect of the present disclosure, a method is provided of enabling secure transaction with authentication to eradicate fraud. In one or more embodiments, the method includes authenticating a customer via a customer application executed on a communication device. In response to authenticating the customer, the method includes enabling a customer-paced communication session between the customer application and a transaction system via a network connection. The method includes monitoring a customer continuity factor in maintaining the customer-paced communication session. In response to receiving a customer request via the customer application, the method includes determining a level of trust in current authentication of the customer based at least in part on the user continuity factor. In response to the level of trust being below a first trust threshold, the method includes directing the customer via the customer application to provide a first customer input comprising a customer-supplied image having a specified contextual element. The method includes re-authenticating the communication session to process the user input by the transaction system based on verification of the received first user-supplied image.

In one aspect of the present disclosure, a secure authentication system is provided that enables secure transaction with easier authentication to eradicate fraud. In one or more embodiments, the secure authentication system includes a communication module and a controller that communicatively coupled to the communication module. The controller enables the secure authentication system to authenticate a customer via a customer application executed on a communication device. In response to authenticating the customer, a customer-paced communication session is enabled between the customer application and a transaction system via a network connection. A customer continuity factor in maintaining the customer-paced communication session is monitored. In response to receiving a customer request via the customer application, a level of trust in current authentication of the customer is determined based at least in part on the user continuity factor. In response to the level of trust being below a first trust threshold, the customer is directed via the customer application to provide a first customer input comprising a customer-supplied image having a specified contextual element. The communication session is re-authenticated to process the user input by the transaction system based on verification of the received first user-supplied image.

In one aspect of the present disclosure, a computer-readable storage medium comprises computer-executable instructions, which when executed via a processing unit on a computer performs acts. The acts include authenticating a customer via a customer application executed on a communication device. In response to authenticating the customer, a customer-paced communication session is enabled between the customer application and a transaction system via a network connection. A customer continuity factor in maintaining the customer-paced communication session is monitored. In response to receiving a customer request via the customer application, a level of trust in current authentication of the customer is determined based at least in part on the user continuity factor. In response to the level of trust being below a first trust threshold, the customer is directed via the customer application to provide a first customer input comprising a customer-supplied image having a specified contextual element. The communication session is re-authenticated to process the user input by the transaction system based on verification of the received first user-supplied image.

The following description and annexed drawings set forth certain illustrative aspects and implementations. These are indicative of but a few of the various ways in which one or more aspects may be employed. Other aspects, advantages, or novel features of the disclosure will become apparent from the following detailed description when considered in conjunction with the annexed drawings.

BRIEF DESCRIPTION OF THE DRAWINGS

Aspects of the disclosure are understood from the following detailed description when read with the accompanying drawings. Elements, structures, etc. of the drawings may not necessarily be drawn to scale. Accordingly, the dimensions of the same may be arbitrarily increased or reduced for clarity of discussion, for example.

FIGS. 3A-B are a flow diagram illustrating a method of secure authentication of a customer to eradicate online fraud, according to one or more embodiments;

DETAILED DESCRIPTION

Figure 1:
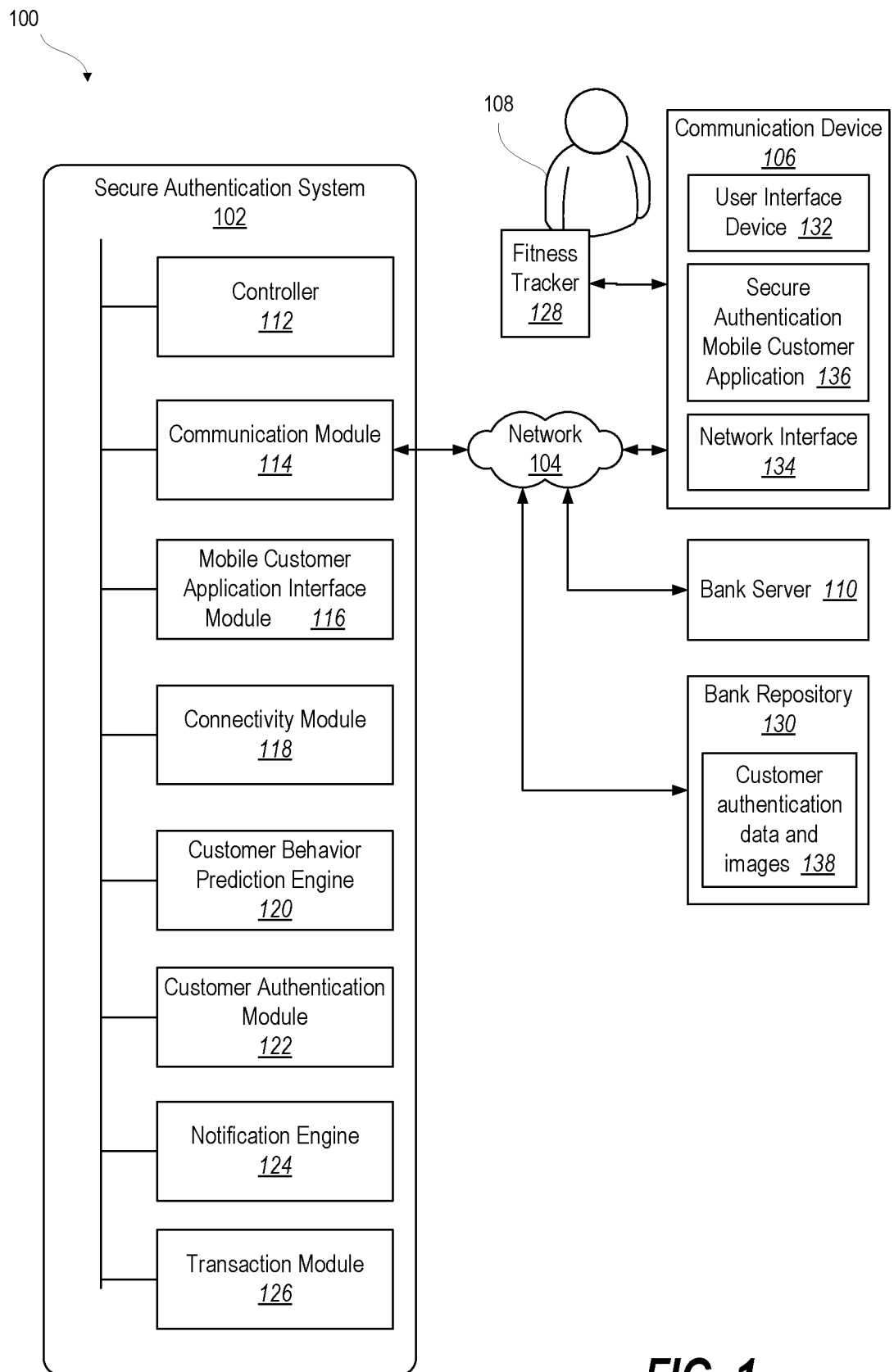
FIG. 1 is a simplified functional block diagram illustrating a secure authentication system (SAS) environment having an SAS that enables secure transactions, according to one or more embodiments.

In one or more embodiments, the present disclosure provides a secure authentication system, computer program recording medium and method that enable secure transaction with authentication to eradicate fraud. A customer is authenticated via a customer application executed on a communication device. A customer-paced communication session is enabled between the customer application and a transaction system via a network connection. A customer continuity factor is monitored in maintaining the communication session. In response to receiving a customer request via the customer application, a level of trust in current authentication of the customer is determined based on the user continuity factor. In response to the level of trust being below a trust threshold, the customer is directed via the customer application to provide a customer request comprising a customer-supplied image having a specified contextual element. The communication session is re-authenticated to process the user input by the transaction system based on verification of the received user-supplied image.

In one or more embodiments, the present disclosure provides a method and system that enables secure transaction with authentication to eradicate fraud. A customer may for example, purchase a financial product via a mobile application provided by the bank. The system monitors the customer's behavior on the mobile application including how fast the customer navigating between the pages, and the products or services the customer is exploring. Further, the system monitors the connectivity of the mobile application with the bank server, and when the connectivity is lost, the system enables serverless architecture and predicts the next action of the user. Based on the customer's monitored behavior, lost connectivity for a time period, predicted next action of the customer and time framed event logs of the mobile application, the system may request for additional authentication information to proceed further. Accordingly, the system may request the customer's mobile application to provide a self-taken image ("selfie") with pet or selfie with companion, or selfie with gestures. In case, the customer provides a set of gestures in his/her live selfie, the system monitors the heart rate of the customer using fitness tracker used by the customer to authenticate the customer based on heart rate. If the system determines the heart rate to be abnormal, then the system generates alerts to notify the bank server and the customer about fraudulent transaction, thereby rejecting the transaction. On other hand, in case of valid authentication, the transaction is processed by the bank server. Thus, the method and system enhance safety for high volume transactions, provides more confidence to customers in digital transactions and avoiding fraudulent transactions.

In one or more embodiments, the present disclosure provides a method that includes receiving a customer request for purchase of a financial product via a mobile application provided by a financial institution. The mobile application is in operative communication with a server associated with the financial institution. The method includes monitoring the customer's behavior on the mobile application. The method includes predicting the next action of the user based on the monitored customer's behavior. The method includes monitoring the connectivity of the mobile application with the server and enabling serverless architecture to receive time framed event logs of the mobile application if the connectivity is lost. The method includes determining the need for additional authentication based on the monitoring of the customer's behavior, lost connectivity for a period of time, the predicted next action of the customer, time framed event logs of the mobile application, or a combination of two or more thereof. The additional authentication includes a selfie provided by the customer. The method includes validating the authentication information provided by the customer.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

The following terms are used throughout the disclosure, the definitions of which are provided herein to assist in understanding one or more aspects of the disclosure.

As used herein, the term "infer" or "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

Turning to the Drawings, FIG. 1 is a simplified functional block diagram illustrating a secure authentication system (SAS) environment 100 having SAS 102 that enables secure transactions over network 104 between communication device 106, which is used by customer 108, and a provider of goods or services, such as bank server 110. SAS 102 includes controller 112, communication module 114, mobile customer application interface (MCAI) module 116, connectivity module 118, customer behavior prediction engine 120, customer authentication module 122, notification engine 124, and transaction module 126.

SAS 102 authenticates customer 108 by being coupled to sources of information previously and currently supplied by the customer 108 for easier authentication to eradicate fraud. In performing authentication, SAS 102 is communicatively coupled, either directly or indirectly via network 104, to communication device 106, fitness tracker 128 that is communicatively coupled to communication device 106, bank server 110, and bank repository 130. Communication device 106 enables customer 108 to interact via user interface device 132. Communication device 106 communicates these interactions via network interface 134 with SAS 102 and bank server 110. Communication device 106 executes a secure authentication mobile customer (SAMC) application 136 that monitors user interactions via user interface device 132. Bank repository 130 stores customer authentication data and images 138, which can include for example customer profile, customer behavior, wish list of products/services, selfie of customer with pet, companion or specific gestures taken in the past. In an exemplary embodiment, In operation, customer 108 may purchase a financial product via SAMC application 136 provided by bank server 110. Connectivity module 118 continuously monitors the connectivity of SAMC application 136 with bank server 110, and when the connectivity is lost, connectivity module 118 enables serverless architecture to receive time framed event logs of the SAMC application 136. The MAIM may monitors the behavior of customer 108 on the mobile application including how fast customer 108 is navigating between the pages, and the products or services the customer 108 is exploring. Based on the monitored behavior of customer 108, the prediction engine may predict the next action of the user. For example, if customer 108 is slow in browsing the pages of the mobile application, the sudden change in monitored behavior may be used to predict abnormal transaction by customer 108 as next action of customer 108. Based on monitored behavior of customer 108, lost connectivity for a time period, predicted next action of customer 108 and time framed event logs of the mobile application, the system may request for additional authentication information to proceed further.

Accordingly, the customer authentication module may request the customer's mobile application to provide a selfie with pet or selfie with companion, or selfie with gestures. In one embodiment, customer 108 can provide the selfie with pet only when customer 108 is at home or at preferred locations. In another aspect, customer 108 can provide the selfie with companion when customer 108 is travelling, and can provide the selfie with onscreen requested gestures when customer 108 is alone without pet/companion at any location. In case, customer 108 provides a set of gestures in his/her live selfie, the customer authentication module receives the heart rate of the customer monitored by a fitness tracker used by customer 108 to authenticate customer 108 based on heart rate. If the customer authentication module determines the heart rate to be abnormal, then the notification engine generates alerts to notify the bank server and customer 108 via his/her registered mobile number about the fraudulent transaction. The transaction module rejects the transaction upon generation of alerts. On other hand, in case of valid authentication, the transaction module processes the transaction. Thus, the method and system enhance safety for high volume transactions, provides more confidence to customers in digital transactions and avoiding fraudulent transactions.

Figure 2:
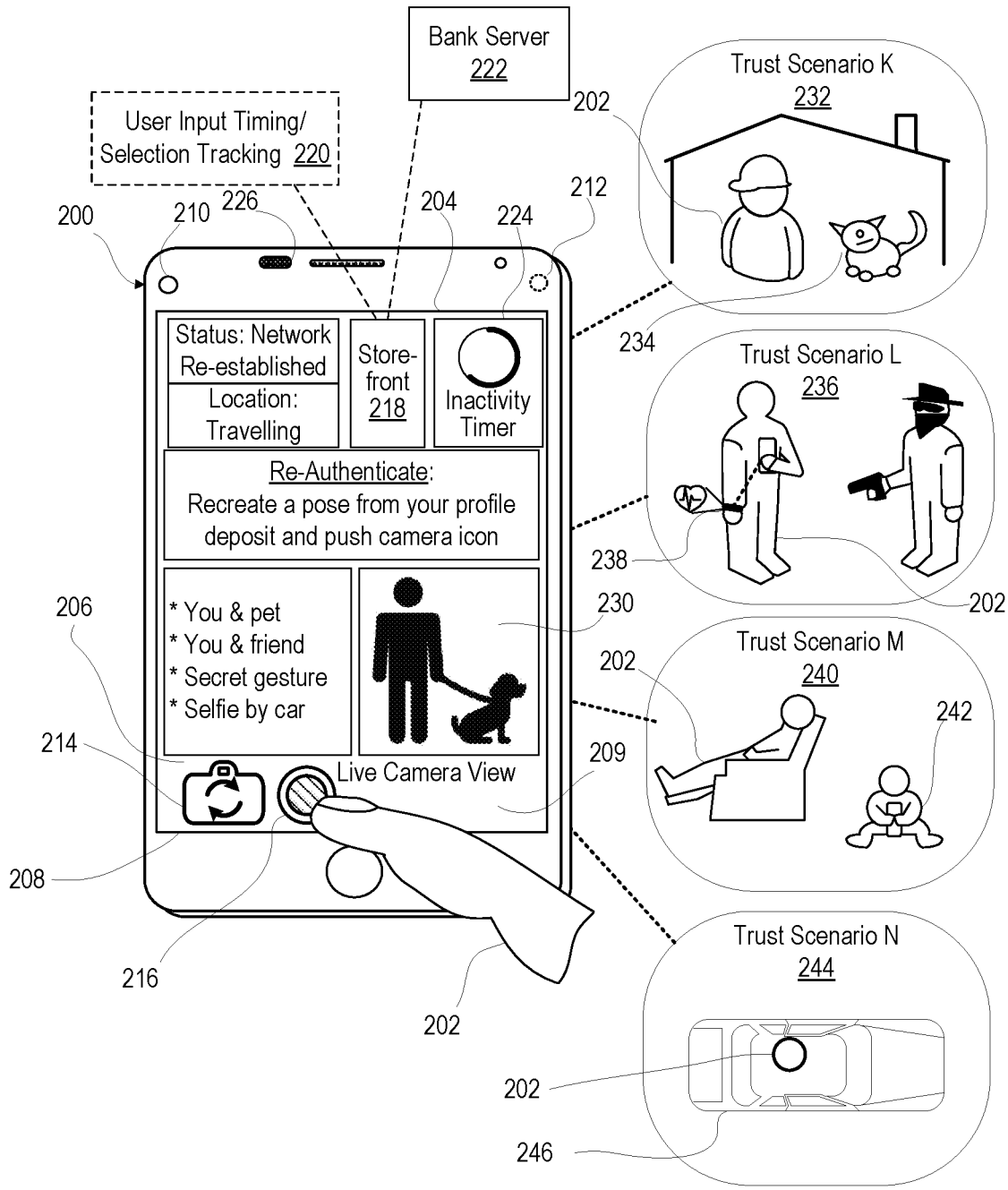
FIG. 2 illustrates a front view of a mobile communication device that is performing secure authentication for a customer, according to one or more embodiments.

FIG. 2 illustrates a front view of mobile communication device 200 that is performing secure authentication for a customer 202, according to one or more embodiments. Communication device 200 includes a graphical touchscreen 204 that presents authentication view 206 on user interface 208 of a secure authentication application 209. Front and back cameras 210, 212 can be selected with camera icon 214 and activated with shutter icon 216. Store front icon 218 provides navigation to transactions available to customer 202, such as goods or services for purchase. User input timing/selection tracking utility 220 can monitor usage of store front icon 218 and related content to recognize a characteristic pattern of customer inputs or characterization of selected content. These transactions for example can be offered by, or facilitated by, a banking institution depicted as bank server 222. Secure transaction application 209 operating on mobile communication device 200 monitors for user continuity of control of the mobile communication device 200. For example, an inactivity timer 224 detects when customer 202 is no longer physically interacting with the touchscreen 204. Inactivity can also include when microphone 226 is not receiving spoken audio inputs from customer 202. Inactivity can also include when front camera 210 does not recognize customer 202 within a field of view. Inactivity can also include when network connection to remote authentication services or to a bank server 222

By monitoring communication device 200, secure authentication application 209 can detect or infer one or more trust scenarios that warrant relaxed or strengthened authentication techniques, such as requiring a customer-supplied image 230. In one example, secure authentication application 209 can detect a context that indicates a higher level of trust even with some interruptions in customer continuity. Trust scenario K 232 can be a home situation where the location, Internet home address, and other tracked items are all consistent with a safe place for the customer. If used, a customer-supplied image 230 can be made with items uniquely associated with both customer 202 and the location, such as pet 234. Factors such as an operational home security system, normal time of day, etc., can allow secure authentication application 209 to adjust upward a level of trust in customer authentication after an interruption in customer continuity.

By contrast, trust scenario L 236 can indicate a situation where many factors are consistent with an authenticated customer. Customer 202 may be cooperative in providing the requested customer inputs for authentication. However, a physiological input, such as from a smart watch 238 with fitness tracking, can detect an abnormally high cardiovascular state that is not consistent with a stationary person. Other contextual factors such as requesting a financial transaction that is unusual for the customer can also create a question of whether the customer 202 is under duress otherwise compromised by an internal or external stressor.

Trust scenario M 240 can similarly appear to be a safe location; however, user behavior in interacting with the communication device 200 can differ markedly from past interactions. For example, a child or a visitor 242 to the location may pick up and use communication device 200 that has been left unattended. Requiring a customer-supplied image can thwart inadvertent or malevolent use of communication device 200.

Trust scenario N 244 illustrates a situation in which customer 202 is not at a frequented location. An interruption in customer continuity of connection can indicate that communication device 200 could possibly be in the hands of an unauthorized third party. Secure authentication application 209 can adjust what customer-supplied image 230 is requested for re-authentication based upon the detected location. For example, items associated with customer 202 that are available to customer 202 at that location can be selected, such as car 246.

Figure 3A:
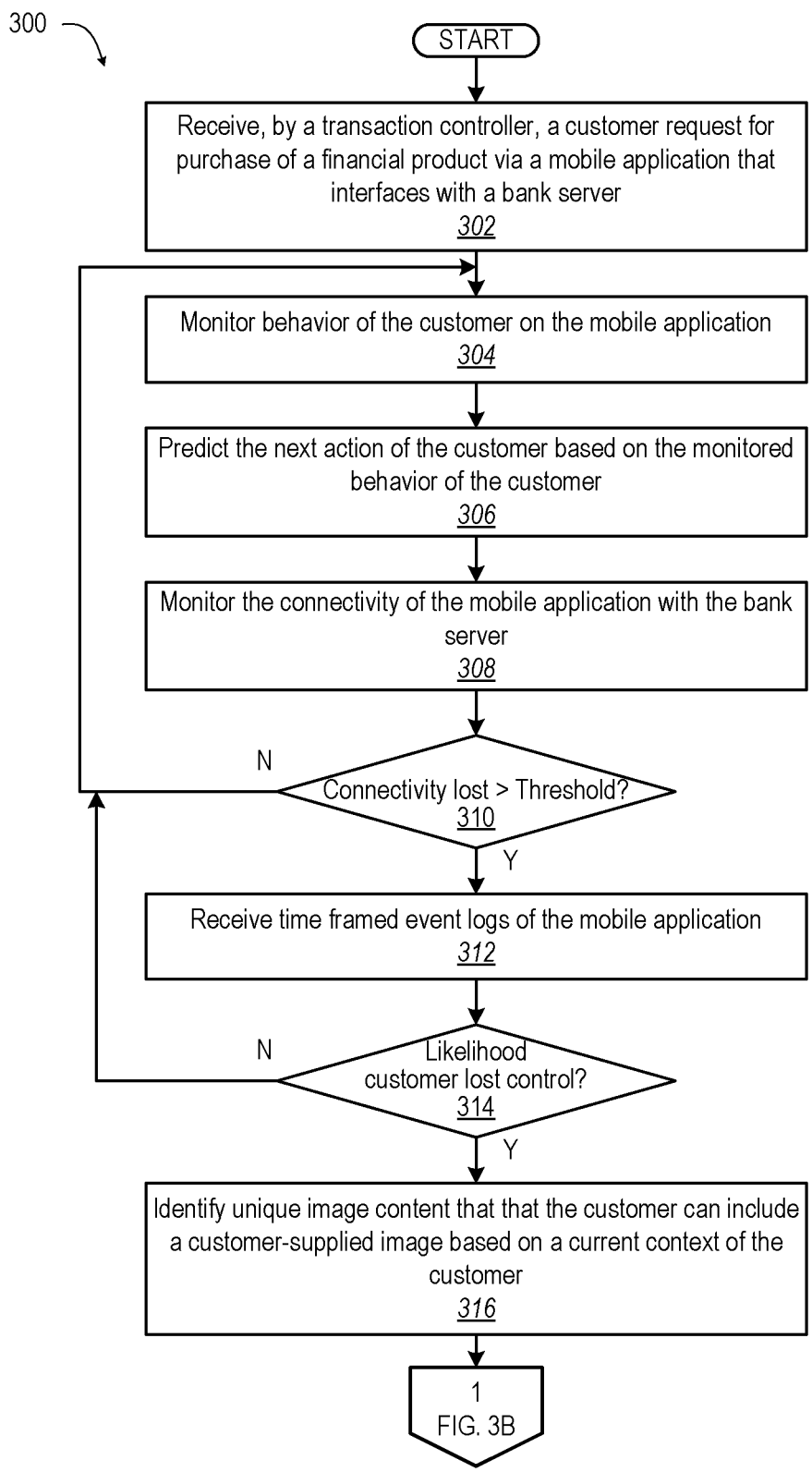

FIGS. 3A-B illustrate a method 300 of secure authentication of a customer to eradicate online fraud. In one or more embodiments, method 300 includes receiving, by a transaction controller, a customer request for purchase of a financial product via a mobile application that interfaces with a bank server (block 302). Method 300 includes monitoring behavior of the customer on the mobile application (block 304). In one or more embodiments, the behavior includes how fast the customer navigates between the pages and the products or services the customer is exploring. Method 300 includes predicting the next action of the customer based on the monitored behavior of the customer (block 306). Method 300 includes monitoring the connectivity of the mobile application with the bank server (block 308). A determination is made whether, and when the connectivity is lost for greater than a time threshold (decision block 310). In response to determining that connectivity is not lost for a time greater than the time threshold, method 300 includes returning to block 304. In response to determining that connectivity was lost for greater than the time threshold, method 300 includes receiving time framed event logs of the mobile application (block 312). Method 300 includes determining whether a likelihood exists of the authenticated customer losing control of the communication device based on the framed event logs (decision block 314). In response to determining that a likelihood does not exist of the authenticated customer losing control of the communication device based on the framed event logs, method 300 returns to block 304. In response to determining that a likelihood does exist of the authenticated customer losing control of the communication device based on the framed event logs in decision block 314, method 300 includes identifying unique image content that that the customer can include a customer-supplied image based on a current context of the customer (block 316). Method 300 includes directing the customer to provide the customer-supplied image containing the unique image content for additional authentication information to proceed further (block 318). In one or more embodiments, method 300 includes directing the customer to include a pet in a self-taken image ("selfie") based on determining that the customer is at home. In one or more embodiments, method 300 includes directing the customer to include a particular companion in the selfie based on determining that the customer is at a location associated with travelling with the companion. In one or more embodiments, method 300 includes directing the customer to include very specific postures, gestures or other indications to confirm that the customer is the respondent. A determination is made whether a received customer-supplied image verifies the customer (decision block 320).

In response to not verifying the received customer-supplied image, method 300 includes generating alerts to notify the bank server and the customer via his/her registered mobile number about the fraudulent transaction (block 322). Method 300 includes rejecting the transaction upon generation of alerts (block 324). Then method 300 ends.

In one or more embodiments, in response to verifying the received customer-supplied image, method 300 further includes protections against an authenticated customer who may not be sufficiently responsible to engage in a transaction. To this end, method 300 includes receiving physiological data from the communication device, such as originating in a fitness band that is linked to the communication device (block 326). Method 300 includes determining whether the physiological data indicates that the customer is in mentally qualified to engage in a legally-binding transaction (decision block 328). For example, a heart rate above a certain threshold that is not correlated with current or recent running movement can be indicative of a person under duress or mentally distraught. For another example, impaired motion, speech or hand coordination detected by the communication device can be indicative of intoxication. In response determining that the customer is not mentally qualified, method 300 includes sending an alert to customer service representative to interact with the customer (block 330). Then method 300 ends. In response to determining that the customer is mentally qualified, method 300 notifies the bank server that the customer is authenticated in order to enable the transaction (block 332). Then method 300 ends.

Figure 4A:
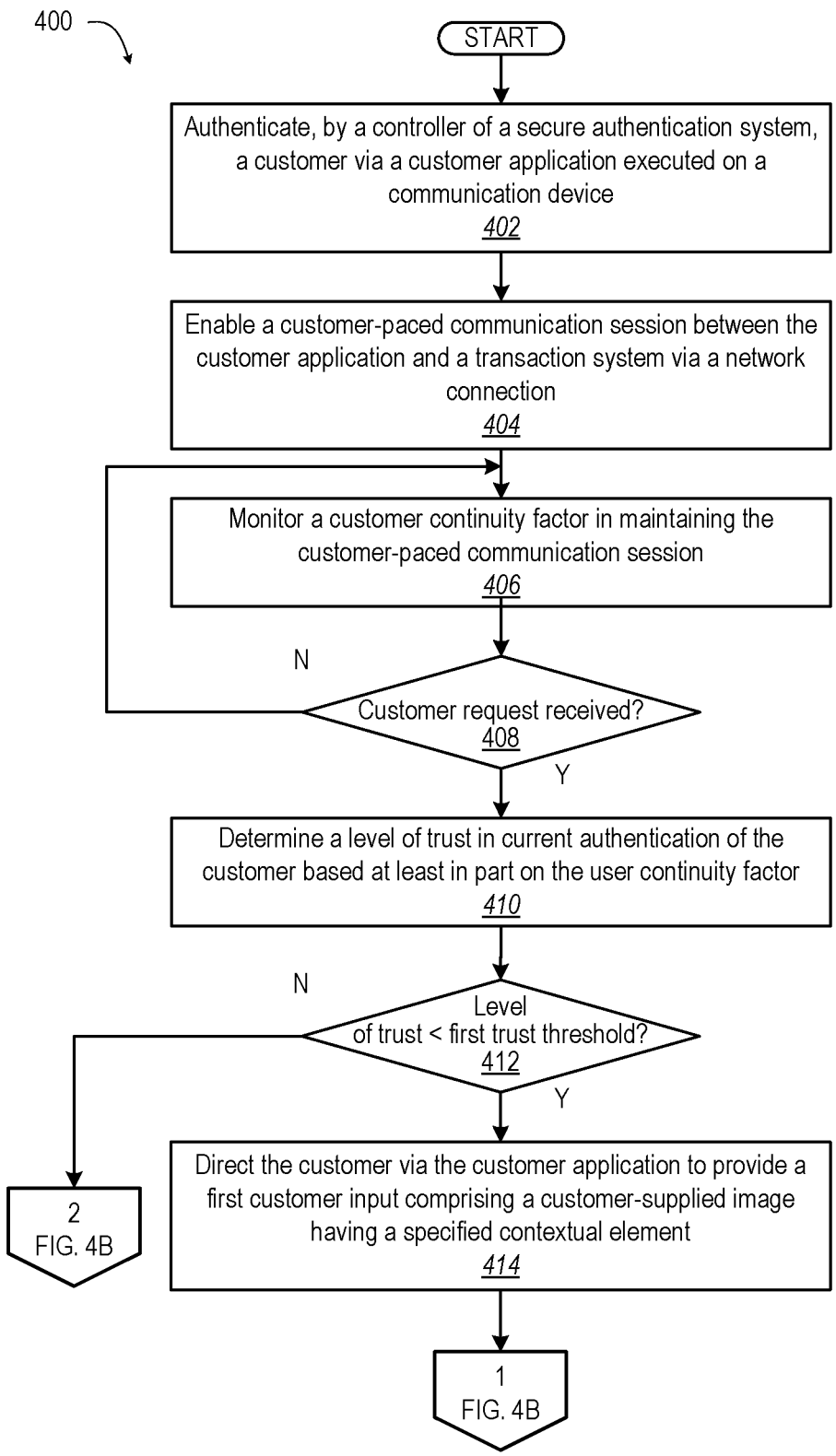
FIGS. 4A-B are a flow diagram illustrating an example method of enabling secure transaction with easier authentication to eradicate fraud, according to one or more embodiments.
Figure 4B:
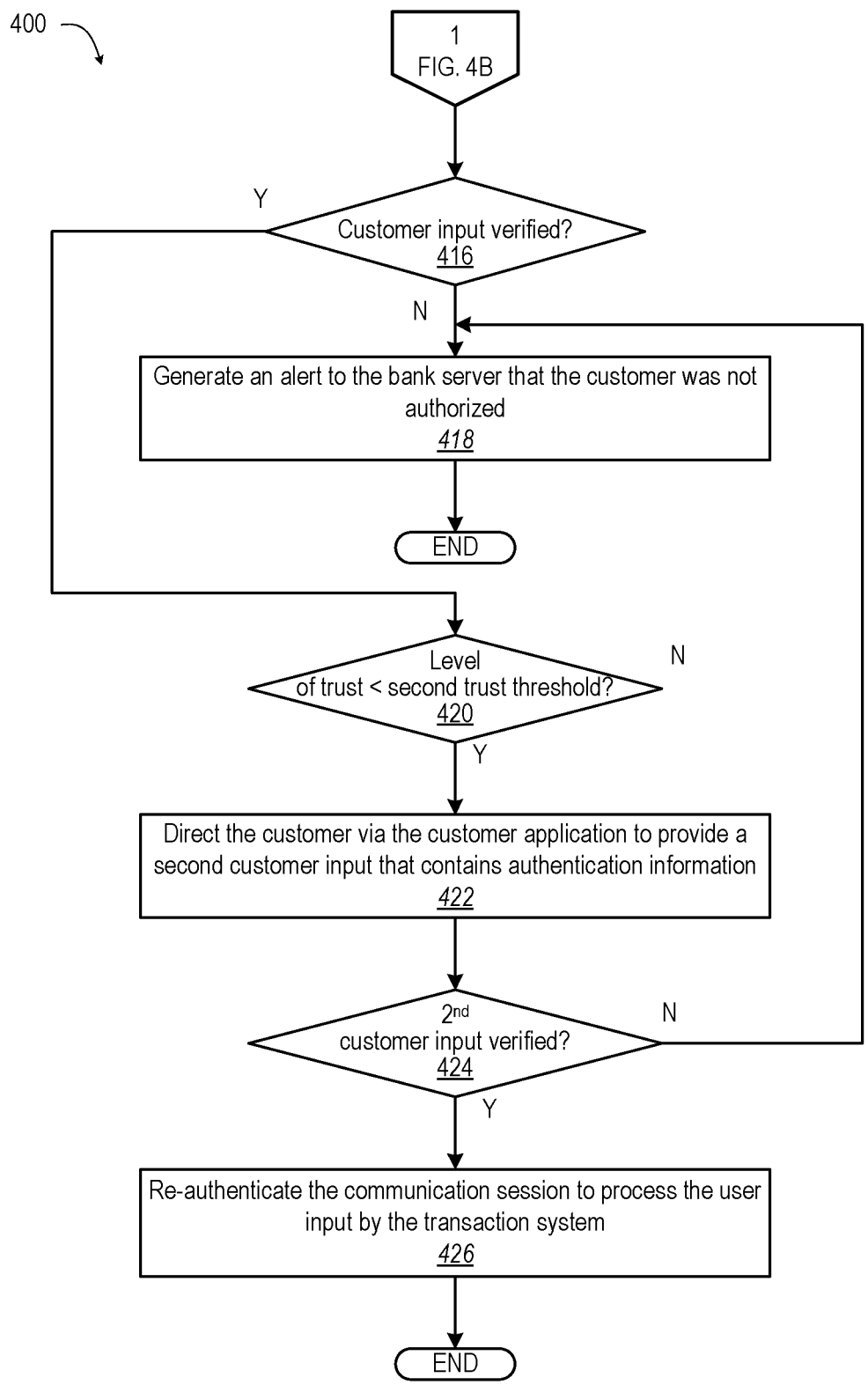

FIGS. 4A-B are a flow diagram illustrating example method 400 of enabling secure transaction with easier authentication to eradicate fraud. In one or more embodiments, method 400 includes authenticating, by a controller of a secure authentication system, a customer via a customer application executed on a communication device (block 402). In response to authenticating the customer, method 400 includes enabling a customer-paced communication session between the customer application and a transaction system via a network connection (block 404). Method 400 includes monitoring a customer continuity factor in maintaining the customer-paced communication session (block 406). A determination is made whether a customer request is received via the customer application (decision block 408). In response to determining that a customer request is not received via the customer application, method 400 returns to block 406. In response to determining that a customer request is received via the customer application, method 400 includes determining a level of trust in current authentication of the customer based at least in part on the user continuity factor (block 410). A determination is made whether the level of trust is below a first trust threshold (decision block 412). In response to the level of trust being below the first trust threshold, method 400 includes directing the customer via the customer application to provide a first customer input comprising a customer-supplied image having a specified contextual element (block 414). A determination is made whether a received first customer input is verified (decision block 416). In response to not verifying a received first customer input, method 400 includes generating an alert to the bank server that the customer was not authorized (block 418). Then method 400 ends.

In one or more embodiments, in response to the level of trust not being below the first trust threshold in decision block 412, method 400 includes determining whether the level of trust is below a second trust threshold that greater than the first trust threshold (decision block 420). In response to determining that the level of trust is below the second trust threshold, method 400 includes directing the customer via the customer application to provide a second customer input that contains authentication information (block 422). For example, an interruption in customer use can be short enough that requiring a customized selfie may be unwarranted as too intrusive. In order to enhance user experience, a simple re-entering of a passcode may suffice. In response to the level of trust being below the second trust threshold, method 400 includes directing the customer via the customer application to provide a second customer input comprising authentication information. A determination is made whether a received second customer input is verified (decision block 424). In response to verifying a received second customer input, method 400 returns to block 418 to re-authenticate the communication session to process the user input by the transaction system. Then method 400 ends. In response to not verifying a received second customer input, method 400 includes generating an alert that the customer was not authorized (block 428). Then method 400 ends. In response to the level of trust is not below the second trust threshold in decision block 420, method 400 returns to block 426 to re-authenticating the communication session to process the user input by the transaction system. Then method 400 ends.

In one or more embodiments, method 400 includes directing the customer via the customer application to provide the first customer input by: (i) associating one or more tangible things that have previously accompanied the customer; and (ii) selecting the specified tangible thing of the one or more tangible things for inclusion in the customer-supplied image.

In one or more embodiments, method 400 includes directing the customer via the customer application to provide the second customer input by: (i) accessing an image library comprising at least one previously submitted customer-supplied image; (ii) directing the customer to recreate the previously submitted customer-supplied image; and (iii) identifying a correlation between the previous-submitted and recreated customer-supplied images. In one or more particular embodiments, the specified contextual element comprises a selected one of: (i) a pet; (ii) a human companion; and (iii) and anatomical posing of the customer.

In one or more embodiments, only one threshold is used. In response to verifying a received first customer input, method 400 includes re-authenticating the communication session and notifying the bank server to process the user input by the transaction system.

Figure 5:
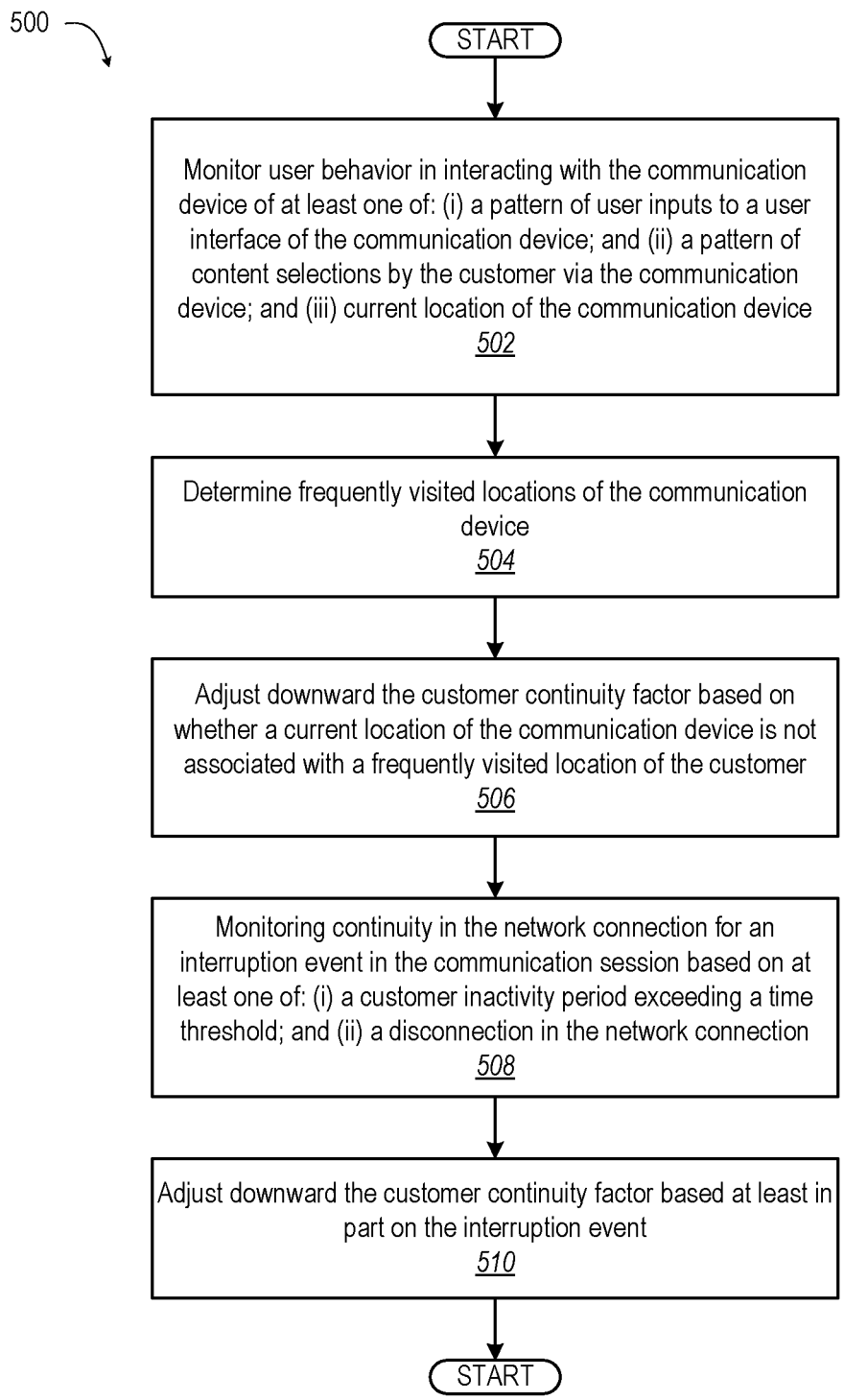
FIG. 5 is a flow diagram illustrating a method for monitoring the customer continuity factor in maintaining the customer-paced communication session, according to one or more embodiments.

FIG. 5 is a flow diagram illustrating method 500 for monitoring the customer continuity factor in maintaining the customer-paced communication session. Method 500 includes monitoring user behavior in interacting with the communication device of at least one of: (i) a pattern of user inputs to a user interface of the communication device; and (ii) a pattern of content selections by the customer via the communication device; and (iii) current location of the communication device (block 502).

In one or more embodiments, method 500 includes determining frequently visited locations of the communication device (block 504). Method 500 includes adjusting downward the customer continuity factor based on whether a current location of the communication device is not associated with a frequently visited location of the customer (block 506).

In one or more embodiments, method 500 includes monitoring continuity in the network connection for an interruption event in the communication session based on at least one of: (i) a customer inactivity period exceeding a time threshold; and (ii) a disconnection in the network connection (block 508). Method 500 includes adjusting downward the customer continuity factor based at least in part on the interruption event (block 510). Then method 500 ends.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

Figure 6:
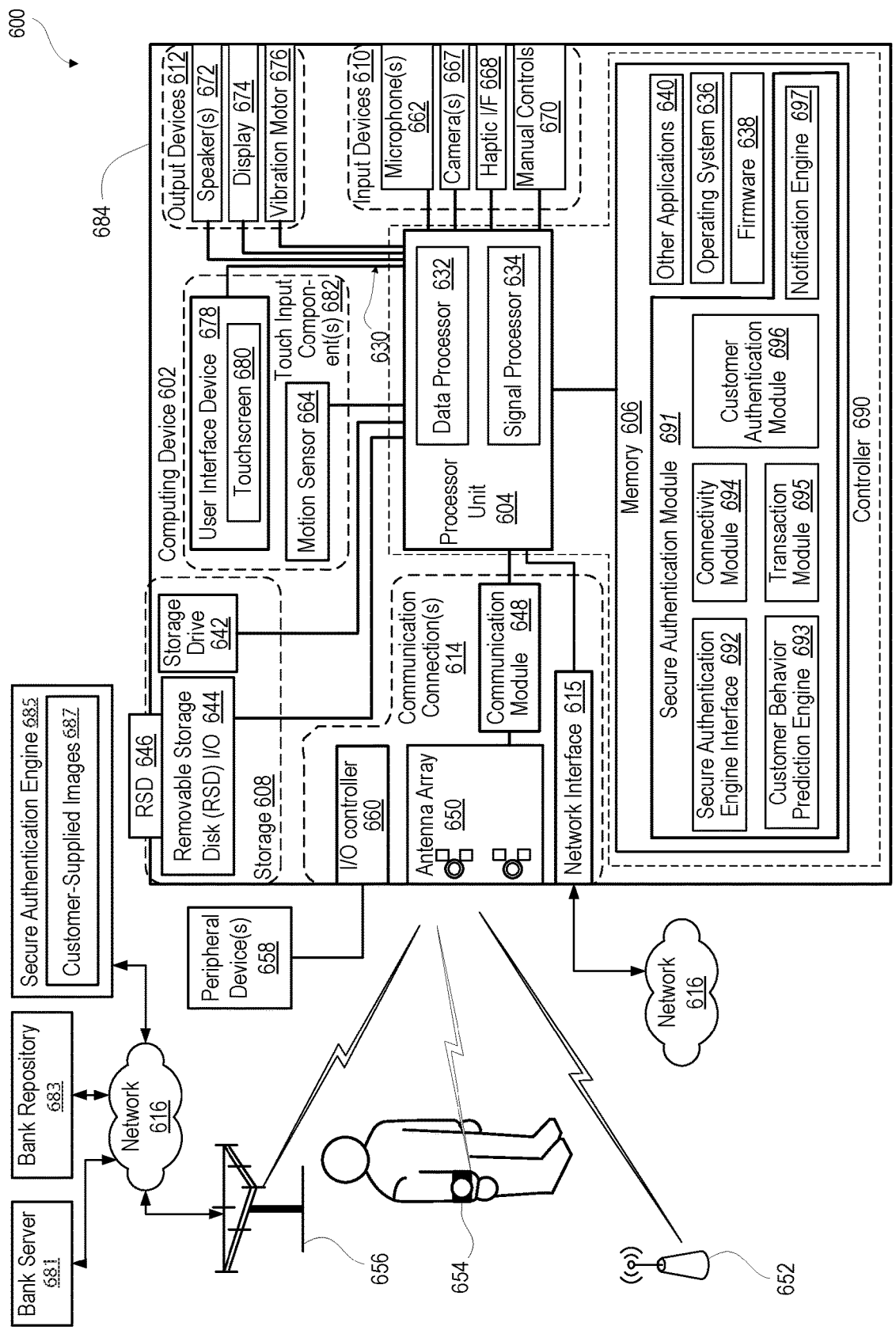
FIG. 6 illustrates a block diagram of a system having a computing device that performs secure authentication based on customer-supplied images, according to one or more embodiments.

FIG. 6 illustrates a system 600 including a computing device 602 configured to implement one or more embodiments provided herein. In one configuration, computing device 602 includes at least one processing unit 604 and memory 606. Depending on the exact configuration and type of computing device, memory 606 may be volatile, such as random access memory (RAM), non-volatile, such as random operating memory (ROM), flash memory, etc., or a combination of the two. In other embodiments, computing device 602 includes additional features or functionality. For example, device 602 may include additional storage such as removable storage or non-removable storage, including, but not limited to, magnetic storage, optical storage, etc. Such additional storage is illustrated in FIG. 6 by storage 608. In one or more embodiments, computer readable instructions to implement one or more embodiments provided herein are in storage 608. Storage 608 may store other computer readable instructions to implement an operating system, an application program, etc. Computer readable instructions may be loaded in memory 606 for execution by processing unit 604, for example.

The term "computer readable media" as used herein includes computer storage media. Computer storage media includes volatile and nonvolatile, removable and non-removable media implemented in any method or technology for storage of information such as computer readable instructions or other data. Memory 606 and storage 608 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by computing device 602. Any such computer storage media is part of computing device 602.

Computing device 602 includes input device(s) 610 such as keyboard, mouse, pen, voice input device, touch input device, infrared cameras, video input devices, or any other input device. Output device(s) 612 such as one or more displays, speakers, printers, or any other output device may be included with computing device 602. Input device(s) 610 and output device(s) 612 may be connected to computing device 602 via a wired connection, wireless connection, or any combination thereof. In one or more embodiments, an input device 610 or an output device 612 from another computing device may be used as input device(s) 610 or output device(s) 612 for computing device 602. Computing device 602 may include communication connection(s) 614 that includes network interface 615 to facilitate communications via a network 616 with one or more other computing devices 618 that communicate for authentication engine 620. Certain functionalities can be performed by software applications resident in memory 606, such as binary tactile communication utility 622 that includes text-to-binary converter 624, vibration driver 626, and touch pattern recognition engine 628.

Referring now to an example specific component makeup and the associated functionality of the presented components, computing device 602 can incorporate a wide range of functionality increasingly typical of mobile devices. Processor unit 604 can be an integrated circuit (IC) that connects, via a plurality of bus interconnects 630, to a plurality of functional components of computing device 602. Processor unit 604 can include one or more programmable microprocessors, such as data processor 632 and digital signal processor (DSP) 634 of processor unit 604, which may both be integrated into a single processing device, in some embodiments. Processor unit 604 controls the communication, user interface, and other functions and/or operations of computing device 602. These functions and/or operations thus include, but are not limited to including, application data processing and signal processing. Computing device 602 may use hardware component equivalents such as special purpose hardware, dedicated processors, general purpose computers, microprocessor-based computers, micro-controllers, optical computers, analog computers, dedicated processors and/or dedicated hard wired logic. Connected to processor unit 604 is memory 606, which can include volatile memory and/or non-volatile memory. Memory 606 stores software, such as operating system 636, as well as firmware 638. One or more other executable applications 640 can be stored within memory 606 for execution by processor unit 604. Memory 606 may be augmented by on-device data storage, such as storage drive 642. Also connected to processor unit 604 is removable storage device (RSD) input/output (I/O) interface 644 that receives a RSD 646 for additional storage.

According to the illustrative embodiment, computing device 602 supports wireless communication via a communication module 648. Communication module 648 directs and power modulates a transmission beam at selected frequencies over an antenna array 650. For example, computing device 602 may support communication protocols and transceiver radio frequencies appropriate for a wireless local area network (WLAN), illustrated as node 652. Computing device 602 can communicate over a personal access network (PAN) with devices such as a smart watch 654. Computing device 602 can communicate with a radio access network (RAN) 656 that is part of a wireless wide area network (WWAN). In certain embodiments, computing device 602 may also support a hardwired local access network (LAN) (not shown) or peripheral devices 658 via an I/O controller 660.

Input devices 610 includes microphone(s) 662 that receive user audible inputs. Motion sensor 664 can detect contextual motion of computing device 602 as well as intentional user inputs according to aspects of the present disclosure. Image capturing device, such as a camera 667, can receive gestures and other image data. Haptic control 668 can provide an interface such as for braille reading or manual inputs. Other manual or keys 670 can have dedicated or programmed capabilities.

Output devices 612 includes audio speaker(s) 672 that can augment or provide alternate presentation of the visual or tactile outputs or provide playback. Display 674 presents graphical or alphanumeric information in a visual form. Vibration motor 676 provides alerts and more detailed information according to aspects of the present disclosure. Computing device 602 can utilize touchscreen 680 and/or motion sensor 664 as a touch input component 682 for aspects of the present disclosure.

User interface device 678 such as, or including, a touchscreen 680, represents a component acting as both an input device 610 and an output device 612. Computing device 602 can be wholly or substantially encompassed by an enclosure 684. In one or more embodiments, computing device 602 can be a distributed system of wireless or wired links or a component subsystem incorporated into a larger assembly or system.

In one or more embodiments, secure authentication is largely executed on each computing device 602 serving as a mobile device for customer 654. Some network functions are remotely accessed, such as a bank server 681, bank repository 683, and secure authentication engine 685 containing customer-supplied images 687. Other functionality according to aspects of the present disclosure are performed by a controller of processor unit 604 executing secure authentication module 691 that is contained in memory 606. Secure authentication module 691 includes secure authentication engine interface 692 that is communicatively coupled to secure authentication engine 685, customer behavior prediction engine 693, connectivity module 694, transaction module 695, customer authentication module 696, and notification engine 697.

Figure 7:
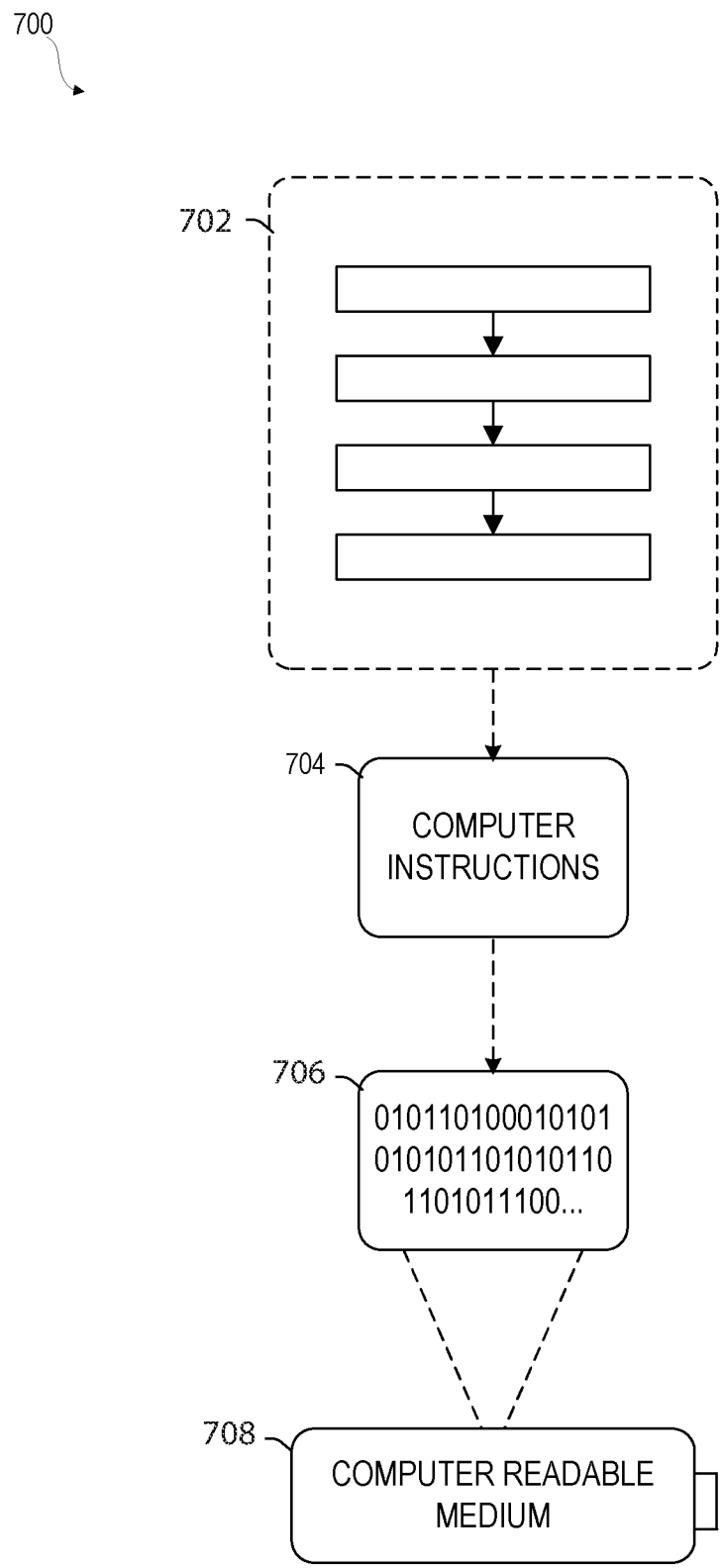
FIG. 7 illustrates a block diagram of example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 7, wherein an implementation 700 includes a computer-readable medium 708, such as a CD-R, DVD-R, flash drive, a platter of a hard disk drive, etc., on which is encoded computer-readable data 706. This computer-readable data 706, such as binary data including a plurality of zero's and one's as shown in 706, in turn includes a set of computer instructions 704 configured to operate according to one or more of the principles set forth herein. In one such embodiment 700, the processor-executable computer instructions 704 may be configured to perform a method, such as method 300 of FIGS. 3A-B, method 400 of FIGS. 4A-B, or method 500 of FIG. 5. In another embodiment, the processor-executable instructions 704 may be configured to implement a system, such as the system 100 or communication device 106 of FIG. 1 or computing device 602 of FIG. 6. Many such computer-readable media may be devised by those of ordinary skill in the art that are configured to operate in accordance with the techniques presented herein.

One or more embodiments may employ various artificial intelligence (AI) based schemes for carrying out various aspects thereof. One or more aspects may be facilitated via an automatic classifier system or process. A classifier is a function that maps an input attribute vector, $x=(x1, x2, x3, x4, xn)$, to a confidence that the input belongs to a class. In other words, $f(x)=$confidence (class). Such classification may employ a probabilistic or statistical-based analysis (e.g., factoring into the analysis utilities and costs) to prognose or infer an action that a user desires to be automatically performed.

A support vector machine (SVM) is an example of a classifier that may be employed. The SVM operates by finding a hypersurface in the space of possible inputs, which the hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein, may be inclusive of statistical regression utilized to develop models of priority.

One or more embodiments may employ classifiers that are explicitly trained (e.g., via a generic training data) as well as classifiers which are implicitly trained (e.g., via observing user behavior, receiving extrinsic information). For example, SVMs may be configured via a learning or training phase within a classifier constructor and feature selection module. Thus, a classifier may be used to automatically learn and perform a number of functions, including but not limited to determining according to a predetermined criteria.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A method of enabling a secure transaction with authentication to eradicate fraud, the method comprising:
    associating a customer with one or more customer-specific tangible things that have previously accompanied the customer to authenticate the customer;
    storing the association in a customer profile for authenticating the customer;
    authenticating the customer via a customer application executed on a communication device;
    in response to authenticating the customer, enabling a customer-paced communication session between the customer application and a transaction system via a network connection;
    monitoring a customer continuity factor in maintaining the customer-paced communication session;
    in response to receiving a customer request via the customer application, determining a level of trust established by a current authentication of the customer based at least in part on the customer continuity factor; and
    in response to the level of trust being below a first trust threshold:
        selecting a specified tangible thing from the one or more customer-specific tangible things to be included in a customer-supplied image;
        directing the customer via the customer application to provide a first customer input comprising the customer-supplied image containing the specified tangible thing;
        receiving the customer-supplied image from the communication device;
        receiving, with the customer-supplied image and from the communication device, a heart rate of the customer and movement data specifying a movement of the customer detected by the communication device; and
        in response to receiving the customer-supplied image, the heart rate of the customer, and the movement data:
            making a first determination that the specified tangible thing in the customer-supplied image matches another instance of the specified tangible thing included in a previously received customer-supplied image;
            making a second determination that the customer is mentally qualified to make the customer request by determining that the heart rate of the customer is correlated with a heart rate associated with the movement of the customer specified by the movement data; and
            executing the customer request based on the first determination and the second determination.

2. The method of claim 1, further comprising, in response to the level of trust not being below the first trust threshold:
    determining whether the level of trust is below a second trust threshold that is greater than the first trust threshold; and
    in response to determining that the level of trust is below the second trust threshold:
        directing the customer via the customer application to provide a second customer input that contains authentication information; and
    in response to the level of trust being below a third trust threshold that is lower than the first trust threshold:
        directing the customer via the customer application to provide a third customer input comprising authentication information; and
        re-authenticating the customer-paced communication session to process the customer request using the transaction system based on either one of: (i) verification of the second customer input that was received and (ii) determining that the level of trust is above the second trust threshold.

3. The method of claim 1, wherein monitoring the customer continuity factor in maintaining the customer-paced communication session comprises monitoring at least one of: (i) customer interactions with the communication device; and (ii) continuity in the network connection.

4. The method of claim 3, further comprising monitoring the customer interactions of at least one of: (i) a pattern of user inputs to a user interface of the communication device, (ii) a pattern of content selections by the customer via the communication device, and (iii) a current location of the communication device.

5. The method of claim 4, further comprising:
determining frequently visited locations of the communication device; and
adjusting downward the customer continuity factor based on whether the current location of the communication device is not associated with a frequently visited location of the customer.

6. The method of claim 3, further comprising:
determining whether an interruption event in the customer-paced communication session has occurred based on at least one of: (i) a customer inactivity period exceeding a time threshold and (ii) a disconnection in the network connection; and
adjusting downward the customer continuity factor based at least in part on the interruption event.

7. The method of claim 1, further comprising directing the customer via the customer application to provide a second customer input, wherein directing the customer to provide the second customer input comprises:
accessing an image library comprising at least one previously submitted customer-supplied image;
directing the customer to recreate the at least one previously submitted customer-supplied image; and
identifying a correlation between the at least one previously submitted customer-supplied image and recreated customer-supplied images.

8. The method of claim 1, wherein the specified tangible thing comprises a selected one of: (i) a pet; (ii) a human companion; and (iii) and anatomical posing of the customer.

9. A secure authentication system that enables secure transaction with authentication to eradicate fraud, the secure authentication system comprising:
a communication module; and
a controller communicatively coupled to the communication module to enable the secure authentication system to:
associate a customer with one or more customer-specific tangible things that have previously accompanied the customer to authenticate the customer;
store the association in a customer profile for authenticating the customer;
authenticate the customer via a customer application executed on a communication device;
in response to authenticating the customer, enable a customer-paced communication session between the customer application and a transaction system via a network connection;
monitor a customer continuity factor in maintaining the customer-paced communication session;
in response to receiving a customer request via the customer application, determine a level of trust in current authentication of the customer based at least in part on the customer continuity factor; and
in response to the level of trust being below a first trust threshold:
select a specified tangible thing from the one or more customer-specific tangible things to be included in a customer-supplied image;
direct the customer via the customer application to provide a first customer input comprising the customer-supplied image containing the specified tangible thing;
receive the customer-supplied image from the communication device;
receive, with the customer-supplied image and from the communication device, a heart rate of the customer and movement data specifying a movement of the customer detected by the communication device; and
in response to receiving the customer-supplied image, the heart rate of the customer, and the movement data:
make a first determination that the specified tangible thing in the customer-supplied image matches another instance of the specified tangible thing included in a previously received customer-supplied image;
make a second determination that the customer is mentally qualified to make the customer request by determining that the heart rate of the customer is correlated with a heart rate associated with the movement of the customer specified by the movement data; and
execute the customer request based on the first determination and the second determination.

10. The secure authentication system of claim 9, wherein, in response to the level of trust not being below the first trust threshold, the controller enables the secure authentication system to:
determine whether the level of trust is below a second trust threshold that is greater than the first trust threshold; and
in response to determining that the level of trust is below the second trust threshold:
direct the customer via the customer application to provide a second customer input that contains authentication information; and
in response to the level of trust being below a third trust threshold that is lower than the first trust threshold:
direct the customer via the customer application to provide a third customer input comprising authentication information; and
re-authenticate the customer-paced communication session to process the customer request using the transaction system based on either one of: (i) verification of the second customer input that was received and (ii) determining that the level of trust is above the second trust threshold.

11. The secure authentication system of claim 9, wherein the controller enables the secure authentication system to monitor the customer continuity factor in maintaining the customer-paced communication session by monitoring at least one of: (i) customer interactions with the communication device; and (ii) continuity in the network connection.

12. The secure authentication system of claim 11, wherein the controller enables the secure authentication system to monitor the customer interactions of at least one of: (i) a pattern of user inputs to a user interface of the communication device, (ii) a pattern of content selections by the customer via the communication device, and (iii) a current location of the communication device.

13. The secure authentication system of claim 12, wherein the controller enables the secure authentication system to:
determine frequently visited locations of the communication device; and adjust downward the customer continuity factor based on whether the current location of the communication device is not associated with a frequently visited location of the customer.

14. The secure authentication system of claim 11, wherein the controller enables the secure authentication system to:
   determine whether an interruption event in the customer-paced communication session has occurred based on at least one of: (i) a customer inactivity period exceeding a time threshold, and (ii) a disconnection in the network connection; and
   adjust downward the customer continuity factor based at least in part on the interruption event.

15. The secure authentication system of claim 9, wherein the controller further enables the secure authentication system to direct the customer via the customer application to provide a second customer input, wherein the controller enables the secure authentication system to direct the customer to provide a second customer input by enabling the secure authentication system to:
   access an image library comprising at least one previously submitted customer-supplied image;
   direct the customer to recreate the at least one previously submitted customer-supplied image; and
   identify a correlation between the at least one previously submitted customer-supplied image and recreated customer-supplied images.

16. The secure authentication system of claim 9, wherein the specified tangible thing comprises a selected one of: (i) a pet; (ii) a human companion; and (iii) and anatomical posing of the customer.

17. A computer-readable storage medium comprising computer-executable instructions, which when executed via a processing unit on a computer performs acts, comprising:
   associating a customer with one or more customer-specific tangible things that have previously accompanied the customer to authenticate the customer;
   storing the association in a customer profile for authenticating the customer;
   authenticating the customer via a customer application executed on a communication device;
   in response to authenticating the customer, enabling a customer-paced communication session between the customer application and a transaction system via a network connection;
   monitoring a customer continuity factor in maintaining the customer-paced communication session;
   in response to receiving a customer request via the customer application, determining a level of trust in current authentication of the customer based at least in part on the customer continuity factor; and
   in response to the level of trust being below a first trust threshold:
      selecting a specified tangible thing from the one or more customer-specific tangible things to be included in a customer-supplied image;
      directing the customer via the customer application to provide a first customer input comprising the customer-supplied image containing the specified tangible thing;
      receiving the customer-supplied image from the communication device;
      receiving, with the customer-supplied image and from the communication device, a heart rate of the customer and movement data specifying a movement of the customer detected by the communication device; and
      in response to receiving the customer-supplied image, the heart rate of the customer, and the movement data:
         making a first determination that the specified tangible thing in the customer-supplied image matches another instance of the specified tangible thing included in a previously received customer-supplied image;
         making a second determination that the customer is mentally qualified to make the customer request by determining that the heart rate of the customer is correlated with a heart rate associated with the movement of the customer specified by the movement data; and
         executing the customer request based on the first determination and the second determination.

18. The computer-readable storage medium of claim 17, wherein the computer-executable instructions, which when executed via the processing unit on the computer performs acts, comprising:
   in response to the level of trust not being below the first trust threshold:
      determining whether the level of trust is below a second trust threshold that is greater than the first trust threshold; and
      in response to determining that the level of trust is below the second trust threshold:
         directing the customer via the customer application to provide a second customer input that contains authentication information;
   in response to the level of trust being below a third trust threshold that is lower than the first trust threshold:
      directing the customer via the customer application to provide a third customer input comprising authentication information; and
   re-authenticating the customer-paced communication session to process the customer request using the transaction system based on either one of: (i) verification of the second customer input that was received and (ii) determining that the level of trust is not below the second trust threshold.

19. The computer-readable storage medium of claim 17, wherein monitoring the customer continuity factor in maintaining the customer-paced communication session comprises monitoring at least one of: (i) customer interactions with the communication device; and (ii) continuity in the network connection.

20. The computer-readable storage medium of claim 19, further comprising monitoring the customer interactions of at least one of: (i) a pattern of user inputs to a user interface of the communication device, (ii) a pattern of content selections by the customer via the communication device, and (iii) a current location of the communication device.

* * * * *